US012691426B2

(12) United States Patent
Bar et al.

(10) Patent No.: US 12,691,426 B2
(45) Date of Patent: Jul. 28, 2026

(54) DEVICE FOR INCORPORATION OF PULVERULENT MATERIALS, ESPECIALLY DUST-EXPLOSIVE PULVERULENT MATERIALS, INTO A LIQUID, ESPECIALLY AN INFLAMMABLE LIQUID

(71) Applicant: SHERWIN-WILLIAMS COATINGS DEUTSCHLAND GMBH, Wuppertal (DE)

(72) Inventors: Markus Bar, Vaihingen (DE); Peter Deininger, Kornwestheim (DE)

(73) Assignee: Sherwin-Williams Coatings Deutschland GmbH, Wuppertal (DE)

( * ) Notice: Subject to any disclaimer, the term of this patent is extended or adjusted under 35 U.S.C. 154(b) by 904 days.

(21) Appl. No.: 17/757,459

(22) PCT Filed: Dec. 15, 2020

(86) PCT No.: PCT/EP2020/086243
§ 371 (c)(1),
(2) Date: Jun. 16, 2022

(87) PCT Pub. No.: WO2021/122610
PCT Pub. Date: Jun. 24, 2021

(65) Prior Publication Data

US 2023/0038859 A1 Feb. 9, 2023

(30) Foreign Application Priority Data

Dec. 16, 2019 (EP) .................................... 19216645

(51) Int. Cl.
*B01F 25/53* (2022.01)
*B01F 23/50* (2022.01)
(Continued)

(52) U.S. Cl.
CPC .............. *B01F 25/53* (2022.01); *B01F 23/56* (2022.01); *B01F 23/59* (2022.01); *B01F 25/52* (2022.01);
(Continued)

(58) Field of Classification Search
CPC ........................... B01F 25/53; B01F 35/71745
See application file for complete search history.

(56) References Cited

U.S. PATENT DOCUMENTS 3,207,365 A * 9/1965 Bault ...................... B01F 25/53 222/54
5,240,683 A 8/1993 Maurel et al.
(Continued)

FOREIGN PATENT DOCUMENTS

CN 1058922 2/1992
EP 1712271 B1 11/2008
(Continued)

OTHER PUBLICATIONS

International Search Report for international appl. No. PCT/EP2020/086243, dated Mar. 1, 2021 (6 pages, including English translation).
(Continued)

*Primary Examiner* — Marc C Howell

(57) ABSTRACT

The invention relates to a device for incorporation of dust-explosive pulverulent materials into readily inflammable liquids, wherein the device includes the following: at least one liquid circuit (10), wherein the liquid circuit comprises at least one liquid vessel (11), a pipeline system (12), and at least one pump (13), and wherein the liquid circuit is designed to accommodate a combustible liquid; at least one powder vessel (30) designed to accommodate at least one pulverulent material (31) to be incorporated into the liquid, and wherein the powder vessel is connected to the liquid
(Continued)

circuit, especially to the pipeline system, in a fluid-conducting manner via a powder feed conduit (32).

6 Claims, 1 Drawing Sheet

(51) Int. Cl.

| | |
|---|---|
| ***B01F 25/52*** | (2022.01) |
| ***B01F 35/21*** | (2022.01) |
| ***B01F 35/71*** | (2022.01) |
| ***B01F 35/83*** | (2022.01) |

(52) U.S. Cl.

CPC .... *B01F 35/2113* (2022.01); *B01F 35/71745* (2022.01); *B01F 35/833* (2022.01)

(56) References Cited

U.S. PATENT DOCUMENTS

| | | | | |
|---|---|---|---|---|
| 5,642,939 A | | 7/1997 | Comardo | |
| 5,665,787 A | * | 9/1997 | Nowak | C08J 9/0085 521/64 |
| 10,960,367 B1 | * | 3/2021 | LoPresti | B01F 35/2111 |
| 2006/0233042 A1 | | 10/2006 | Buchholz et al. | |
| 2011/0299357 A1 | * | 12/2011 | Vasshus | E21B 21/062 366/132 |
| 2013/0194888 A1 | * | 8/2013 | Hotta | B01F 27/41 366/132 |
| 2015/0238913 A1 | * | 8/2015 | Luharuka | B01F 25/85 366/138 |
| 2016/0271575 A1 | * | 9/2016 | Berger | B01F 27/2123 |
| 2017/0333928 A1 | * | 11/2017 | Chapron | B01F 25/85 |
| 2019/0060850 A1 | * | 2/2019 | Gillespie | B01F 25/51 |

FOREIGN PATENT DOCUMENTS

| | | | | |
|---|---|---|---|---|
| EP | 3069786 A1 | | 9/2016 | |
| EP | 3275532 A1 | | 1/2018 | |
| EP | 2961523 B1 | | 4/2019 | |
| GB | 2195094 A | * | 3/1988 | B01F 1/0022 |

OTHER PUBLICATIONS

Written Opinion for international appl. No. PCT/EP2020/086243, dated Mar. 1, 2021 (6 pages).

"Alkyd Resins" from Rompp Chemie Lexikon, online version, https://roempp.thieme.de/lexicon/RD=01=01507, 9 pages, last updated Aug. 2006 (retrieved Jun. 16, 2022).

First Office Action issued for Chinese patent application No. 202080086528.9, dated Mar. 23, 2024 (26 pages, including English translation).

He Shouzhi et al., "Phacoemulsification," (May 2000), China Medical Science and Technology Publishing Hours, p. 8.

Hu Chunbo et al. "Principles of Powder Rocket Engines," (Sep. 2019), National Defense Industry Press, p. 37-39.

* cited by examiner

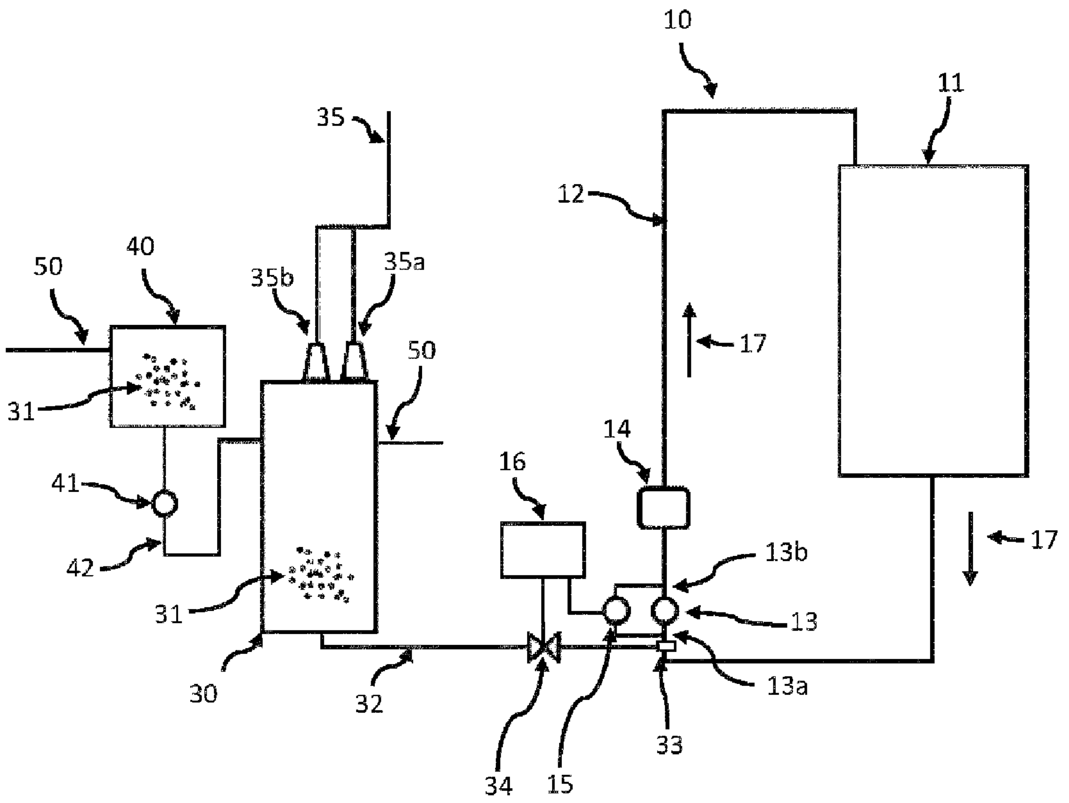
10
11
12
17
35
50
40
35b
35a
50
31
14
16
41
42
13b
31
13
30
32
13a
33
34
15
17

DEVICE FOR INCORPORATION OF PULVERULENT MATERIALS, ESPECIALLY DUST-EXPLOSIVE PULVERULENT MATERIALS, INTO A LIQUID, ESPECIALLY AN INFLAMMABLE LIQUID

The invention relates to a device for the incorporation of pulverulent materials, especially of dust-explosive pulverulent materials, into an, especially readily inflammable, liquid, and to a corresponding method.

Plastic hollow spheres in powder form, what are known as lightweight fillers, are introduced into liquids in order to reduce the density of the liquids. For this purpose, powders are interspersed in the liquid and stirred in. Due to physical properties of a powder or of a powder-air mixture, and an associated dust explosion risk, this is often not possible or cannot be readily achieved in the case of lightweight fillers. Given interspersing of dust-explosive pulverulent materials in solvent-containing liquids, the solid passes through an inflammable gas phase (for example due to evaporated solvent) overlaying the liquid, and there may lead to the ignition of the gas or of a gas mixture.

The direct introduction of a pulverulent material or of a lightweight filler into a liquid to prevent a dust explosion is similarly problematic. If the lightweight filler is conveyed by pressure/impact devices (diaphragm pumps etc.), this regularly leads to blockages and/or clumping of the lightweight filler in the feed conduit and/or the pump.

The invention is therefore based upon the object of providing a device and a method for the incorporation of, especially dust-explosive, pulverulent materials into a liquid, especially a readily inflammable liquid, which, in a safe and at the same time cost-effective manner, makes it possible to produce a homogeneous mixture of the pulverulent material and the liquid, wherein a mixing of solvent vapor and powder may occur at no point in time, so that an ignition of solvent vapor and/or liquid, and thus an explosion, is avoided.

This object is achieved according to the invention by the subject matter according to the present claims.

In particular, the object is achieved by a device for the incorporation of pulverulent materials, especially of dust-explosive pulverulent materials, into an, especially readily inflammable, liquid, wherein the device comprises the following:

at least one liquid circuit, wherein the liquid circuit comprises at least one liquid vessel, a pipeline system, and at least one pump, and wherein the liquid circuit is designed to accommodate an, especially combustible, liquid; at least one powder vessel which is designed to accommodate at least one pulverulent material to be incorporated into the liquid, and wherein the powder vessel is connected to the liquid circuit, especially to the pipeline system, in a fluid-conducting manner via a powder feed conduit.

An essential idea of the invention is that a homogeneous mixture of, especially dust-explosive, pulverulent materials and a liquid, especially a combustible or readily inflammable liquid, may be ensured under safe circumstances. The device makes it possible to directly incorporate the pulverulent material into the liquid without the pulverulent material needing to pass through a layer of inflammable (solvent) vapor. The term "inflammable vapors" and can be understood to mean, for example, solvent vapors which are formed by the evaporation of one or more solvents contained in the liquid. The device according to the invention prevents the formation of such vapors, so that the process of incorporating the pulverulent material into the liquid can be implemented without danger.

In one embodiment, the powder feed conduit is arranged at a pump inlet side and is connected via a connection, in a fluid-conducting manner, to the pipeline system of the liquid circuit, wherein a distance of the connection of the powder feed conduit from a pump inlet of the pump is at most 70 cm, more preferably less than 50 cm.

This enables a negative pressure at the pump inlet of the pump to be optimally utilized. Furthermore, due to the distance between the connection of the powder feed conduit and the pump inlet of the pump, it is possible to provide further connections in this region, for example for a pressure measurement in the pipeline system of the liquid circuit.

In one embodiment, a ratio of a diameter of the pipeline system of the liquid circuit to a diameter of the powder feed conduit is 2.5:1.5.

This enables volumetric flows in the powder feed conduit and the liquid circuit to be optimized and/or matched to one another. In alternative embodiments, the ratio can also deviate from the value of 2.5:1.5, for example in order to compensate for physical properties such as the viscosity of the liquid and/or a pump capacity of the pump.

In one embodiment, the pump, especially a rotary piston pump, is designed to allow a liquid to circulate in the liquid circuit such that a negative pressure at the pump inlet side suctions the pulverulent material out of the powder vessel, through the powder feed conduit, into the liquid circuit by means of a gas stream.

This enables the pulverulent material that is to be incorporated to be introduced directly into the liquid. In this way, a formation of inflammable and/or explosive (solvent) vapors and/or (solvent) vapor/air mixtures is suppressed. This increases safety during an incorporation process and prevents personal injury and/or material damage.

In one embodiment, the liquid circuit further comprises at least one, preferably active, homogenizer, especially a chopper, which is designed to homogenize a mixture of the pulverulent material and the liquid, wherein the homogenizer is preferably arranged at a pump outlet side, and wherein the homogenizer is preferably at a maximum of 30 cm, more preferably less than 25 cm, distant from a pump outlet of the pump at a pump outlet side.

This enables an optimal commixture of the pulverulent material and the liquid to be achieved in order to obtain a mixture that is as homogeneous as possible, especially to already achieve such in the pipeline system. An active homogenizer can additionally be actively controlled and/or regulated in order to mix as homogeneously as possible depending on the liquid and/or pulverulent material that are used. In one embodiment, for example, it is possible that a rotational speed of an impeller of the homogenizer is actively increased as a viscosity of the liquid increases, and/or that the rotational speed of the impeller of the homogenizer is adapted to a change in viscosity during a mixing operation.

In one embodiment, the liquid circuit further comprises at least one pressure measuring device, especially comprising a differential pressure measuring device, which is designed to detect a pressure at the pump inlet side and/or the pump outlet side in the liquid circuit, and wherein a pressure difference of a pressure at the pump inlet side and a pressure at the pump outlet side is in a range of −10-−600 mbar, preferably −100-−400 mbar.

The detection of the pressure in the pipeline system enables the detected variable, especially the differential pressure, to be used for further (optimization) processes of a mixing operation. Furthermore, via a detection of the pressure in the pipeline system it is possible to quickly and reliably detect damage, for example, a leak in the liquid circuit and/or damage to the pump.

In one embodiment, the powder feed conduit comprises a control valve that is configured to continuously regulate a powder flow and/or a change in powder flow in the liquid circuit.

It is thereby enabled that, in the event of too high a pressure (>−10 mbar) in the pipeline system of the liquid circuit, the liquid cannot penetrate into the powder feed conduit. For this purpose, the control valve can close when the pressure is too high and/or open only when the differential pressure is applied to the pump. Furthermore, the continuous regulation and/or control of the control valve means that a quantity of the pulverulent material to be incorporated into the liquid may be regulated or compensated for via a powder flow and/or a change in powder flow. It is thereby achieved that the proportion of the pulverulent material in the liquid/pulverulent material mixture may be controlled and/or regulated in a controlled manner, and optimized accordingly, via the control valve. “Powder flow” is understood to mean a quantity of pulverulent material that is conveyed through the powder feed conduit in a time interval. “Change in powder flow” is understood to mean a change in the “powder flow” over time. A change in powder flow is caused especially by a change in the pressure in the liquid circuit. According to the invention, further control valves can additionally be present on and/or in the powder feed conduit.

In one embodiment, the pressure measuring device comprises a computing unit, wherein the control valve is communicatively connected to the computing unit, and wherein the computing unit is designed to continuously control the control valve.

This has the result that the proportion of the pulverulent material in the liquid/pulverulent material mixture can be controlled or regulated especially precisely via the control valve, without an employee needing to manually actuate the control valve, for example.

In one embodiment, the control valve continuously regulates the powder flow and/or the change in powder flow by means of the computing unit, based on a programmed function and/or a pressure difference of a pressure at the pump inlet side and a pressure at the pump outlet side.

This has the result that, for example, pressure and/or power fluctuations of the pump can be compensated for since, via the powder feed conduit, such fluctuations pass through to the powder flow of the pulverulent material. The control or regulation of the control valve thus enable an optimal quantity of pulverulent material to always be metered into the liquid. Control via a programmed function allows, for example, the powder flow of the pulverulent material to vary via corresponding control or regulation of the control valve over time (a mixing operation).

In one embodiment, the powder vessel comprises a conveying conduit which is designed to convey the pulverulent material to be incorporated from a powder feed station into the powder vessel by means of a delivery pump, especially a diaphragm pump.

This means that the powder vessel may accommodate a large quantity of pulverulent material for incorporation into the liquid. Pulverulent materials are typically purchased in sacks. One and/or more sacks with pulverulent material can be introduced into the powder feed station in such a way that the pulverulent material is conveyed by means of the delivery pump into the powder vessel without a dust load being created for an employee and/or in the environment in which the device is located.

In one embodiment, the powder vessel and/or the powder feed station comprises at least one gas feed conduit that is configured to supply a gas, especially inert gas, to the pulverulent material such that the pulverulent material is fluidized.

The fluidization of the pulverulent material with a gas, especially with an inert gas, enables the pulverulent material to be conveyed well by the pump and/or the delivery pump without blockages and/or clumping occurring. In addition, the use of inert gas has the result that an outbreak of fire and/or an explosion are prevented, since inert gases are very inert.

In particular, the object according to the invention is also achieved by a method for the incorporation of pulverulent materials, especially of dust-explosive pulverulent materials, into a liquid, especially a readily inflammable liquid, wherein the method comprises the following steps:

- circulating a liquid in a liquid circuit by means of a pump, especially such that a purely fluid aggregate state of the liquid is present;
- suctioning a pulverulent material by means of a gas flow, due to a negative pressure of the pump, out of a powder vessel via a powder feed conduit;
- controlled introduction of the pulverulent material into the liquid in the liquid circuit via a powder feed conduit;
- mixing the liquid and the pulverulent material in the liquid circuit.

This results in the same advantages as described in connection with the device.

In one embodiment, the pulverulent material, before being suctioned, is fluidized by feeding in a gas, preferably an inert gas.

The fluidization of the pulverulent material with a gas, especially with an inert gas, enables the pulverulent material to be optimally conveyable by the pump and/or the delivery pump, and a clumping and/or clogging to be prevented. In addition, the use of inert gas has the result that an outbreak of fire and/or an explosion are prevented, since inert gases are very inert.

In one embodiment, the mixing of the liquid and the pulverulent material in the liquid circuit is actively carried out by a homogenizer, especially a chopper, wherein a mixture is produced by the mixing.

In one embodiment, the proportion of introduced pulverulent material in the mixture is 0.1-10% by weight, preferably 0.1-5% by weight, 0.1-2.5% by weight, 0.1-1.5% by weight, 0.2-1.2% by weight, especially preferably 0.3-0.8% by weight, and/or 2.5-50% by volume, preferably 5-45% by volume, 7.5-40% by volume, 10-35% by volume, 15-35% by volume, especially 20-35% by volume.

In one embodiment, the controlled introduction of the pulverulent material into the liquid in the liquid circuit takes place via a continuously regulable control valve, wherein the control valve regulates via a computing unit based on a programmed function and/or a pressure difference of a pressure at the pump inlet side and a pressure at the pump outlet side, a powder flow, and/or a change in powder flow, such that a proportion of pulverulent material to be incorporated can be optimized.

This enables an optimal quantity of pulverulent material to always be metered into the liquid via continuous measurement of the negative pressure present at a pump inlet and the control of the control valve based thereon. This method ensures a homogeneous mixture.

In one embodiment, the liquid is formed by a combustible liquid, especially liquid having an ATEX classification (guideline 2014/34/EU), wherein the liquid preferably has a viscosity of 500 mPas-3000 mPas, preferably 1000 mPas-1800 mPas, at 50° C. In the present document, the term "viscosity" is preferably understood to mean a viscosity which is measured using a Physica MCR 301 plate-plate rheometer, with a measuring gap of 0.5 mm according to DIN 53019-1. By complying with the ATEX directives, the necessary safety is ensured when performing the method.

The liquid preferably contains at least one solvent, especially an organic solvent, preferably selected from the list consisting of solvent naphtha, isobutanol, benzene, toluene, xylene, ethyl acetate, butyl acetate, acetone, methyl ethyl ketone, and cyclohexanone, especially xylene. The proportion of solvent is preferably 3-30% by weight, especially 5-20% by weight, relative to the total weight of the liquid.

The liquid preferably contains at least one additive selected from the list consisting of epoxy resin, a polyurethane compound, and an alkyd resin AH. The proportion of additive is preferably 5-60% by weight, especially 10-50% by weight, preferably especially 20-40% by weight, relative to the total weight of the liquid.

The temperature of the liquid, especially at the point in time of the controlled introduction of the pulverulent material into the liquid in the liquid circuit, is preferably from 30-75° C., especially from 40-60° C.

In one embodiment, the pulverulent material (31) comprises holow spheres, especially closed-pore hollow spheres, made of plastic, wherein the hollow spheres preferably have a particle size of 20 μm-140 μm, more preferably 25 μm-55 μm.

This enables, via the introduction of such hollow spheres, a mixture of the liquid and the hollow spheres to be adapted and optimized for a specific purpose (of an end product), depending on hollow sphere type and/or particle size of the hollow spheres and/or density of the hollow spheres and/or liquid type. For example, a stability and/or weight and/or moldability and/or optical properties and/or a texture of the mixture (or the end product) may be optimized. In particular, the hollow spheres may enclose a gas and thereby reversibly deform their volume upon a change in an ambient pressure and/or in an ambient temperature.

Further advantageous embodiments are apparent with reference to the dependent claims.

The invention is also described in the following with respect to further features and advantages using exemplary embodiments which are explained in more detail using the illustration.

Shown are:

FIG. 1 a schematic depiction of the device for the incorporation of pulverulent materials, especially dust-explosive pulverulent materials, into a liquid, especially a readily inflammable liquid Shown in FIG. 1 is a schematic depiction of the device for the incorporation of pulverulent materials, especially dust-explosive pulverulent materials, into a liquid, especially a readily inflammable liquid.

In one exemplary embodiment, the pulverulent material 31 may comprise hollow spheres made of plastic. These hollow spheres have a particle size of, for example, 20 μm-140 μm, preferably 25 μm-55 μm.

Hollow spheres within the meaning of the present invention are preferably microspheres having a cavity volume of at least 30%, especially at least 50%, especially at least 75% of the total volume of the individual microspheres, which contain at least one gas in this cavity.

The expression "at least one gas" encompasses pure gases and gas mixtures of two or more gases.

The at least one gas is preferably selected from air, carbon dioxide, oxygen, nitrogen, helium, neon, argon, or xenon, any organic compounds which are gaseous at room temperature, such as hydrocarbons, or also halogenated hydrocarbons.

Hydrocarbons that are gaseous at room temperature are preferably C1-C5 hydrocarbons which are present in branched or unbranched form (methane to pentane). Especially preferred are air, isobutane, and isopentane, most preferably isopentane.

Microspheres which internally have a single central cavity filled with gas/gases are preferred.

They are preferably closed-pore microspheres.

They are preferably expanded microspheres.

Preferred materials of the microspheres are natural and synthetic, especially synthetic, polymers or copolymers, particularly preferably synthetic copolymers, most preferably cyanoacrylates and polylactides.

The density of the microspheres is preferably less than 100 kg/cm3. The density of the microspheres is particularly preferably between 20 and 100 kg/cm3, most preferably between 20 and 50 kg/cm3.

In one exemplary embodiment, the pulverulent material 31 is introduced into a powder feed station 40. A gas, preferably an inert gas, may be introduced into the powder feed station 40 via a gas feed conduit 50 into the powder feed station 40. This has the result that the pulverulent material 31 is fluidized in the powder feed station 40.

By means of a delivery pump 41, the pulverulent material 31 may be conveyed via a conveying conduit 42 into a powder vessel 30. In one exemplary embodiment, the delivery pump 41 may comprise a diaphragm pump.

In one exemplary embodiment, the powder vessel 31 has a volume of 2000 l. The powder vessel 31 may have a shape which tapers downwards.

Specifically, in one exemplary embodiment, the mold may be designed such that the powder vessel 31 tapers towards an outlet, especially a powder outlet, on the underside of the powder vessel 31.

Alternatively or additionally, the powder vessel 31 may have a breathing conduit 35. The breathing conduit 35 is preferably attached to an upper side of the powder vessel 31. The breathing conduit 35 serves to equalize the pressure in the powder vessel 31 with an ambient pressure in an environment outside the powder vessel 31. For this purpose, a filter **35*b* may be provided on the breathing conduit 35, which filter prevents the pulverulent material 31 from escaping through the breathing conduit 35. Alternatively or additionally, the breathing conduit 35 comprises at least one overpressure valve 35*a*. The overpressure valve 35*a* prevents an excessively high pressure from being able to build up in the powder vessel 31**.

In one exemplary embodiment, the powder vessel 31 has a gas feed conduit 50. This has the result that the pulverulent material 31 in the powder vessel 31 is fluidized by supplying a gas, especially an inert gas. The fluidizing of the pulverulent material 31 in the powder vessel 30 may take place as an alternative or in addition to, especially subsequent to, the fluidizing of the pulverulent material 31 in the powder feed station 40.

In one exemplary embodiment, the powder vessel 30 has a balance for internal weighing of the pulverulent material 31.

In a further exemplary embodiment, the powder vessel 30 has an internal sensor device, wherein the sensor device serves to detect atmospheric data, especially a temperature and/or a pressure and/or a gas concentration, in the powder vessel 30.

In the exemplary embodiment according to FIG. 1, a powder feed conduit 32 is attached in a fluid-conducting manner to the outlet of the powder vessel 30. The powder feed conduit 32 enables the pulverulent material 31 to be fed into the liquid circuit 10.

The liquid circuit 10 comprises a liquid vessel 11, a pipeline system 12, and at least one pump 13. The liquid circuit 10 is designed such that a liquid may circulate through the liquid circuit 10 by means of the pump 13.

In one exemplary embodiment, the flow direction of the liquid in the liquid circuit is illustrated by the arrows 17 in FIG. 1.

In one exemplary embodiment, the liquid comprises at least one alkyd resin AH.

It is preferably an alkyd resin AH as described under the term "alkyd resins" in Römpp Chemie Lexikon, online version, Georg Thieme Verlag, retrieved on 4 Nov. 2018.

The alkyd resins are preferably air-drying and oxidatively drying alkyd resins, especially linseed oil, soybean oil, safflower oil, or ricin alkyd resins.

In one exemplary embodiment, the powder feed conduit 32 is arranged on a pump inlet side 13*a* and is connected, in a fluid-conducting manner, via a connection 33 to the pipeline system 12 of the liquid circuit 10.

A distance between the connection 33 of the powder feed conduit 32 and a pump inlet of the pump 13 is at most 70 cm, more preferably less than 50 cm. This distance can vary depending on the pump type and/or the pump capacity of the pump 13. It is essential that the introduction of the solid takes place substantially immediately upstream of the pump 13, on a pump inlet side 13*a* of the liquid circuit.

Located downstream of the pump 13, on a pump outlet side 13*b*, is a homogenizer 14 that is designed to actively mix the liquid with the—especially dust-explosive—pulverulent material 31 and/or to actively wet the pulverulent material 31.

In one exemplary embodiment, the homogenizer 14 is designed as a chopper with at least one rotatable impeller.

In one exemplary embodiment, the pump 13 is designed as a rotary piston pump. A negative pressure on the pump inlet side 13*a* suctions the pulverulent material 31 out of the powder vessel 30 via the powder feed conduit 32 by means of a gas flow, in order to incorporate the pulverulent material into the liquid in the liquid circuit 10.

In one exemplary embodiment, a differential pressure applied to the pump 13 is measured by means of a pressure measuring device 15. The differential pressure is derived from a pressure at the pump inlet side 13*a* and a pressure at the pump outlet side 13*b*.

In one exemplary embodiment, the powder feed conduit 32 has a control valve 34. The control valve 34 is designed to meter a quantity of the pulverulent material 31 which is to be introduced into the liquid. For this purpose, the control valve 34 may, for example, be controlled by a computing unit 16. In one exemplary embodiment, the control valve 34 continuously regulates by means of the computing unit 16, based on a programmed function and/or a pressure difference of a pressure at the pump inlet side 13*a* and a pressure at the pump outlet side 13*b*.

In this way, either the quantity of pulverulent material 31 to be incorporated can be controlled or regulated via a powder flow, and/or the change in powder flow can be compensated for given a change to said powder flow (caused by a change in the pressure in the liquid circuit 10). It is conceivable, for example, that an introduction of a first portion of the pulverulent material 31 into the liquid changes a viscosity of the liquid. This leads to a change in the pressure difference at the pump 13, and thus to a change in the powder flow. The control valve 34 can be controlled or regulated in order to ensure a constant powder flow of a second (or further) portion of the pulverulent material 31 despite the change in viscosity. Via the control or regulation of the control valve 34, an optimal quantity of pulverulent material 31 can thus always be introduced into the liquid.

In one exemplary embodiment, the control valve 34 can also follow a programmed function which is stored on the computing unit 16.

An optimal quantity of pulverulent material 31 can thus always be introduced via the control or regulation of the control valve 34.

Furthermore, in the event of too high a pressure (>−10 mbar) in the pipeline system of the liquid circuit, the control valve 34 prevents the liquid from penetrating into the powder feed conduit. For this purpose, the control valve 34 can close when the pressure is too high and/or open only when the differential pressure is applied to the pump 13.

In one exemplary embodiment, the powder feed conduit 32 comprises a ball valve which is designed to prevent the liquid from penetrating into the powder feed conduit in the event of too high a pressure (>−10 mbar) in the pipeline system of the liquid circuit. For this purpose, the ball valve can close when the pressure is too high and/or open only when the differential pressure is applied to the pump 13. The ball valve is controlled by the computing unit 16 in the same way as the control valve 34. Alternatively or additionally, a redundant pressure measurement at the pump 13 and/or in the pipeline system 12 may take place for the opening and closing of the ball valve.

The precautions described above always ensure that the presence of solvent vapor is avoided, so that mixing of solvent vapor and pulverulent material 31 cannot occur at any point in time.

In one exemplary embodiment, the liquid vessel 11 may comprise a device which allows a mixture of pulverulent material and liquid to be removed.

At this point it should be noted that all the parts described above, considered alone and in any combination, especially of the details shown in the drawing, are claimed as essential to the invention.

REFERENCE SIGNS

10 Liquid circuit
11 Liquid vessel
12 Pipeline system
13 Pump
13*a* Pump inlet side
13*b* Pump outlet side
14 Homogenizer
15 Pressure measuring device
16 Computing unit
17 Arrow (flow direction)
30 Powder vessel
31 Pulverulent material
32 Powder feed conduit
33 Connection
34 Control valve
35 Breathing conduit
35*a* Overpressure valve
35*b* Filter
40 Powder feed station

41 Delivery pump
42 Delivery conduit
50 Gas feed conduit

What is claimed is:

1. A method for the incorporation of dust-explosive pulverulent materials into a readily inflammable liquid, wherein the method comprises the following steps:

circulating a liquid in a liquid circuit by means of a pump such that a purely fluid aggregate state of the liquid is present, wherein the liquid is a combustible liquid at a temperature of 40° C. to 60° C. having an ATEX classification according to guideline 2014/34/EU, wherein the liquid has a viscosity of 500 mPas-3000 mPas at 50° C.;

suctioning a pulverulent material by means of a gas flow, due to a negative pressure of the pump, out of a powder vessel via a powder feed conduit;

introduction of the pulverulent material into the liquid in the liquid circuit in a controlled manner via a powder feed conduit;

mixing the liquid and the pulverulent material in the liquid circuit.

2. The method of 1, wherein the pulverulent material, before being suctioned, is fluidized by feeding in an inert gas.

3. The method of claim 1, wherein the mixing of the liquid and the pulverulent material in the liquid circuit is actively carried out by a homogenizer, and wherein a mixture is produced by the mixing.

4. The method of claim 3, wherein the proportion of introduced pulverulent material in the mixture is 0.1-1.5% by weight, and/or 5-45% by volume.

5. The method of claim 1, wherein introducing the pulverulent material into the liquid in the liquid circuit in a controlled manner takes place via a continuously regulable control valve, wherein the control valve, via a computing unit, regulates a powder flow and/or a change in powder flow based on a programmed function and/or on a pressure difference of a pressure at the pump inlet side and a pressure at the pump outlet side such that a proportion of pulverulent material to be incorporated can be optimized.

6. The method of claim 1, wherein the pulverulent material comprises closed-pore hollow spheres made of plastic, wherein the hollow spheres preferably have a particle size of 20 μm-140 μm.

* * * * *